(12) United States Patent
Schmidt et al.

(10) Patent No.: US 12,218,909 B2
(45) Date of Patent: Feb. 4, 2025

(54) SPECULATIVE DOMAIN NAME SYSTEM CACHE

(71) Applicant: SAP SE, Walldorf (DE)

(72) Inventors: Oliver Schmidt, Woerth (DE); Andreas Ludwig Erz, Mannheim (DE); Steffen Lammel, St. Leon-Rot (DE); Jian-ping Hui, Xi'an (CN); Peng Xue, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/332,872

(22) Filed: Jun. 12, 2023

(65) Prior Publication Data

US 2024/0414122 A1 Dec. 12, 2024

(51) Int. Cl.
*H04L 61/58* (2022.01)
*H04L 61/5007* (2022.01)
*H04L 67/101* (2022.01)
*H04L 67/56* (2022.01)
*G06F 16/957* (2019.01)

(52) U.S. Cl.
CPC .......... *H04L 61/58* (2022.05); *H04L 61/5007* (2022.05); *H04L 67/101* (2013.01); *H04L 67/56* (2022.05); *G06F 16/9574* (2019.01)

(58) Field of Classification Search
CPC .... H04L 67/56; H04L 67/101; G06F 16/9574
See application file for complete search history.

(56) References Cited

U.S. PATENT DOCUMENTS

| 8,423,672 | B2 * | 4/2013 | Liu ....................... H04L 67/101 |
| | | | 709/245 |
| 2008/0228772 | A1 * | 9/2008 | Plamondon ......... G06F 16/9574 |
| 2018/0191672 | A1 * | 7/2018 | Torres ..................... H04L 67/56 |

\* cited by examiner

*Primary Examiner* — Barbara B Anyan
(74) *Attorney, Agent, or Firm* — Fish & Richardson P.C.

(57) ABSTRACT

Methods, systems, and computer-readable storage media for requesting, from a domain name system (DNS) server within an enterprise network, an IP address for a DNS name associated with a computing device, receiving the IP address, storing the IP address in a speculative DNS cache, the speculative DNS cache being operable to store IP addresses for a set of DNS names including the DNS name, providing, by the speculative DNS cache, a refresh period for the IP address, and determining that the refresh period of the IP address has tolled, and in response, refreshing the IP address in the speculative DNS cache.

20 Claims, 4 Drawing Sheets

SPECULATIVE DOMAIN NAME SYSTEM CACHE

BACKGROUND

Computing devices can communicate with one another over a network. Computing devices can retrieve resources from other computing devices over a network. To enable communication between computing devices, a calling device needs to know the location of the computing device it is to communicate with. This location is indicated by the Internet protocol (IP) address, which can be provided by a domain name system (DNS) server. The DNS server can receive a request for the IP address and returns the IP address to the computing device that issued the request. In the case of retrieving a resource, the resource can be located using a uniform resource locator (URL) that includes a domain name indicating a domain, within which a device that stores the resource is located. To access the resource, the domain name is resolved to an IP address by the DNS server. To reduce a number of requests to the DNS server, a DNS cache is used to store the IP address that has been resolved. The IP address, however, can become outdated and can be refreshed by again requesting resolution of the domain name by the DNS server.

SUMMARY

Implementations of the present disclosure are directed to domain name system (DNS) caches. More particularly, implementations of the present disclosure are directed to a speculative DNS cache that periodically updates cache entries absent trigger.

In some implementations, actions include requesting, from a domain name system (DNS) server within an enterprise network, an IP address for a DNS name associated with a computing device, receiving the IP address, storing the IP address in a speculative DNS cache, the speculative DNS cache being operable to store IP addresses for a set of DNS names including the DNS name, providing, by the speculative DNS cache, a refresh period for the IP address, and determining that the refresh period of the IP address has tolled, and in response, refreshing the IP address in the speculative DNS cache. Other implementations of this aspect include corresponding systems, apparatus, and computer programs, configured to perform the actions of the methods, encoded on computer storage devices.

These and other implementations can each optionally include one or more of the following features: the refresh period is determined based on a refresh rate assigned to the IP address; the refresh rate of assigned to the IP address is determined based on a request frequency associated with the IP address; actions further include storing at least one IP address for the set of DNS names in a local DNS cache that refreshes the at least one IP address at least partially in respond to a request for the IP address from a process; the speculative DNS cache is used to cache IP addresses in response to determining that a number of DNS names in the set of domain is less than a threshold number of DNS names; refreshing the IP address in the speculative DNS cache includes transmitting a DNS name of a URL to the DNS server, and receiving an updated IP address from the DNS server; and the speculative DNS cache is an executable library executed by a process.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
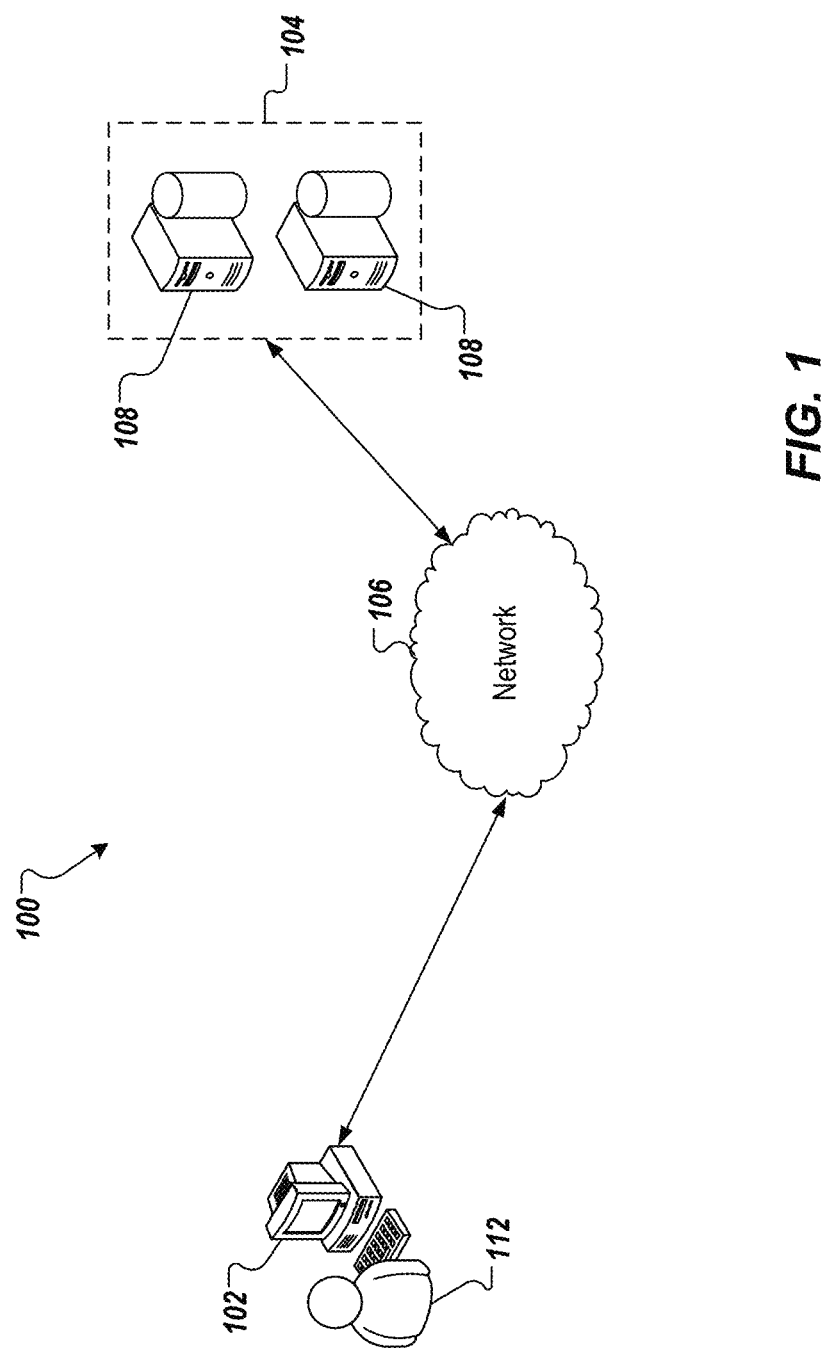
FIG. 1 depicts an example architecture that can be used to execute implementations of the present disclosure.

Implementations of the present disclosure are directed to domain name system (DNS) caches. More particularly, implementations of the present disclosure are directed to a speculative DNS cache that periodically updates cache entries absent trigger. Implementations can include actions of requesting, from a domain name system (DNS) server within an enterprise network, an IP address for a DNS name associated with a computing device, receiving the IP address, storing the IP address in a speculative DNS cache, the speculative DNS cache being operable to store IP addresses for a set of DNS names including the DNS name, providing, by the speculative DNS cache, a refresh period for the IP address, and determining that the refresh period of the IP address has tolled, and in response, refreshing the IP address in the speculative DNS cache.

Implementations of the present disclosure are described in further detail herein with example, non-limiting reference to a web browser. It is contemplated, however, that implementations of the present disclosure can be realized for any appropriate application and/or computer-executed process that communicates over a network (e.g., to retrieve resources, to communicate with a remote computing device).

To provide further context for implementations of the present disclosure, and as introduced above, computer-executed applications can be executed to perform functionality. For example, a web browser can be executed by a computing device to display web pages. As another example, a productivity application (e.g., word processor, spreadsheet application, presentation application) can provide productivity tools for users. In some instances, applications communicate with computing devices over a network to, for example, retrieve resources that are remotely located within the network (e.g., the Internet, an intranet). That is, instead of storing resources locally on the computing device that an application is executed on, resources are retrieved from the network when they are required by the application. In this manner, computing resources (e.g., memory) can be conserved on the computing device. For example, and with non-limiting reference to the example context, a web page can be created from tens, hundreds, if not thousands of resources (e.g., text, images, video, audio) that are remotely stored and are retrieved when the web page is rendered in a web browser.

In the example case of retrieving resources, a uniform resource locator (URL) is used to indicate where a resource is located within a network and is used to retrieve the resource. With reference to the above, non-limiting example, each of the tens, hundreds, if not thousands of resources has a respective URL to indicate where the resource is retrieved from in rendering the web page in the web browser. A URL can be described as a string of characters that defines, for example, a protocol (e.g., hypertext transfer protocol (HTTP), HTTP secure (HTTPS)), a domain name (also referred to as DNS name), and a path within the domain that leads to the resource. For example:

https://domainname.com/resourcepath/resource.txt

It is appreciated that URLs can contain additional elements (e.g., sub-domain, sub-directory), discussion of which is foregone for purposes of simplicity and clarity.

Communication is achieved between devices that have specific addresses referred to as Internet protocol (IP) addresses. An IP address can be described as a string of characters that uniquely identifies a device within a network. Each IP address includes a network identifier and a host identifier. For example:

xxx.xxx.x.yy

In this example, which is based on Internet Protocol version 4 (IPv4), xxx.xxx.x is the network identifier that uniquely identifies a network (sub-network within a network) and yy is the host identifier that uniquely identifies a host (e.g., where a resource is located). As another example:

xxxx:xxxx:xxxx:xxxx:yyyy:yyyy:yyyy:yyyy

In this Internet Protocol version 4 (IPv6) example, xxxx:xxxx:xxxx:xxxx is the network identifier that uniquely identifies a network (sub-network within a network) and yyyy:yyyy:yyyy:yyyy is the host identifier that uniquely identifies a host (e.g., where a resource is located).

In communicating between computing devices (e.g., retrieving a resource using a URL), a DNS is used to resolve the DNS name to an IP address. To this end, a DNS server is provided (e.g., by an internet service provider (ISP)) that performs a look-up of the IP address based on the URL. For example, an application can encounter a DNS name and transmit a request to the DNS server for the IP address assigned to a domain indicated in the DNS name and the DNS returns the IP address. The application can then transmit a request using the IP address to retrieve the resource from the domain.

While use of URLs is discussed herein as an example use case, it is contemplated that communication between computing devices. For example, an application on a first computing device communicating with an application on second computing device over a network is achieved by resolving IP addresses in absence of URLs. For example, the DNS server can provide the IP address of the second computing device to the first computing device, such that the first computing device can transmit a request to and receive a response from the second computing device.

In response to receiving a request to resolve a domain name, the DNS server first checks a DNS cache (discussed in further detail below) to verify whether the IP address for the DNS name is already stored locally. If it is not, the DNS server sends a request to a root name server. The root name server can be described as a name server for the root zone of the DNS. In response to a request from the DNS server, the root name server looks at the top-level domain (TLD) (e.g., .com, .gov, .edu) of the request and returns a location of the TLD server. The DNS server sends a request to the TLD server for the TLD of the DNS name in question. In response to the request, the TLD server provides the DNS server with an authoritative name server for the DNS name. The DNS server sends a request to the authoritative name server, which returns the IP address.

Caching is implemented along the above-described chain to reduce latency in resolving DNS names to IP addresses. In some examples, a DNS cache can be provided as a stand-alone program that functions with an operating system (OS) of a computing device. In some scenarios, a computing device executing the application originating the request can include a local DNS cache (as a stand-alone program) that serves as a temporary store for IP addresses of previously requested DNS names. As another example, the DNS server can maintain a DNS cache that serves as a temporary store for IP addresses of previously requested DNS names. The DNS cache of the DNS server can also function as a store for other information, such as TLD servers for respective DNS names and/or authoritative name servers for respective DNS names.

Caching can reduce latency by avoiding requests along the above-described chain. For example, when the application encounters a URL, the local DNS cache can be checked to determine whether the IP address corresponding to the URL is stored therein. If so, the application can use the locally stored IP address. If not, a request can be transmitted to the DNS server for the IP address, as described above. In response to a request, the DNS server can check its DNS cache to determine whether the IP address corresponding to the URL is stored therein. If so, the DNS server can return the IP address to the application. If not, the DNS server sends a request to the root name server and so forth, as described above.

Through use of DNS caches, the number of requests along the chain is reduced, which also reduces loads on servers along the chain. For example, without any DNS caches, the DNS server, the root server, the TLD server, and the authoritative name server would each be heavily loaded with requests. Further, responses to requests for DNS name resolution would have increased latency thereby diminishing performance. This is compounded by the fact that, for example and with reference to the non-limiting example, rendering of a web page in a web browser can require a request for each of the tens, hundreds, if not thousands of resources that make up the web page.

However, information stored in a DNS cache can become outdated. For example, and without limitation, cloud computing environments can include multiple nodes that provide resources that are accessed by applications, each node having a respective IP address assigned thereto. In some instances, the IP address for a resource can change over time. Consequently, IP addresses stored in a DNS cache might only be valid for a certain period of time. To handle this, each DNS cache entry can be associated with a time-to-live (TTL). That is, the TTL for each IP address stored in the DNS cache is made available to the DNS cache. In some examples, the TTL for an IP address is assigned by the domain of the IP address. In some examples, the TTL is a period of time (e.g., measured in seconds) that tolls from the time that the IP address is stored in the DNS cache. In other words, the TTL can be described as a period of validity of the IP address within the DNS cache.

In a traditional approach, if an IP address is requested by an application, the local DNS cache is checked to determine whether the IP address is available in the DNS cache, and whether the TTL of the IP address has expired. If the TTL has expired, the IP address is updated by transmitting a request for the IP address along the chain (e.g., to the DNS server), as described above. In another traditional approach, a so-called prefetch strategy can be implemented, in which, if an IP address is requested by an application, the local DNS cache is checked to determine whether the IP address is available in the DNS cache. However, if the TTL of the IP address has not yet expired, but will expire in a pre-configured period of time, the IP address is updated by transmitting a request for the IP address along the chain (e.g., to the DNS server), as described above. In some examples, while the IP address is being updated, the technically still valid, yet soon-to-be expired IP address from the DNS cache is returned to the application.

In both above-introduced traditional approaches, updating of the IP address is triggered by a request from the application. That is, the request from the application is a trigger to update the IP address (e.g., depending on status of TTL). More particularly, both above-introduced traditional approaches are reactive in that they are triggered by a request from the application and are based on the TTL of the IP address being requested. Such approaches are not optimal in that they do not account for certain eventualities that can increase latency. For example, while techniques, such as redundancy, seek to increase the availability of upstream DNS servers, the DNS servers can, relatively frequently, be unavailable. Consequently, updating of an IP address in response to a request can take longer than desired (e.g., waiting for the DNS server to be available and respond) or can fail (e.g., due to a timeout, because the DNS server was not available in time). That is, such traditional approaches do not mitigate instances of unavailability of the DNS servers.

In view of the above context, implementations of the present disclosure provide a speculative DNS cache that periodically updates cache entries (IP addresses) absent trigger (e.g., without a request from an application). In some implementations, and as described in further detail herein, the speculative DNS cache of the present disclosure provides a refresh frequency for IP addresses stored therein and proactively updates the IP addresses at the refresh frequency even though the IP address has not been requested. As described herein, the speculative DNS cache of the present disclosure is speculative, in that, instead of waiting for a request from an application (a trigger) to update the IP address, receipt of such a request is speculated. Hence, the IP address is proactively updated based on the refresh frequency in anticipation of an eventual request.

In some implementations, the speculative DNS cache is provided as an executable library that can be executed by processes and, as such, is not a standalone program operating with an OS, for example. In some examples, the speculative DNS cache is used in scenarios where a number of IP addresses that are to be cached is less than a threshold number of IP addresses. In some examples, the speculative DNS cache of the present disclosure is absent knowledge of or access to TTLs of IP addresses.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a DNS server, a resource server, a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host one or more applications that retrieve resources from one or more resource servers (e.g., servers, on which resources are stored) using IP addresses of the one or more resource servers. In some examples, an application can be provisioned using one or more processes that execute functionality of the application. In some implementations, and as described in further detail herein, a process of the one or more processes can execute a speculative DNS cache. For example, the speculative DNS cache can be provided as a library executed by the process. As such, the speculative DNS cache is not a stand-alone program executed within a computing environment.

Figure 2:
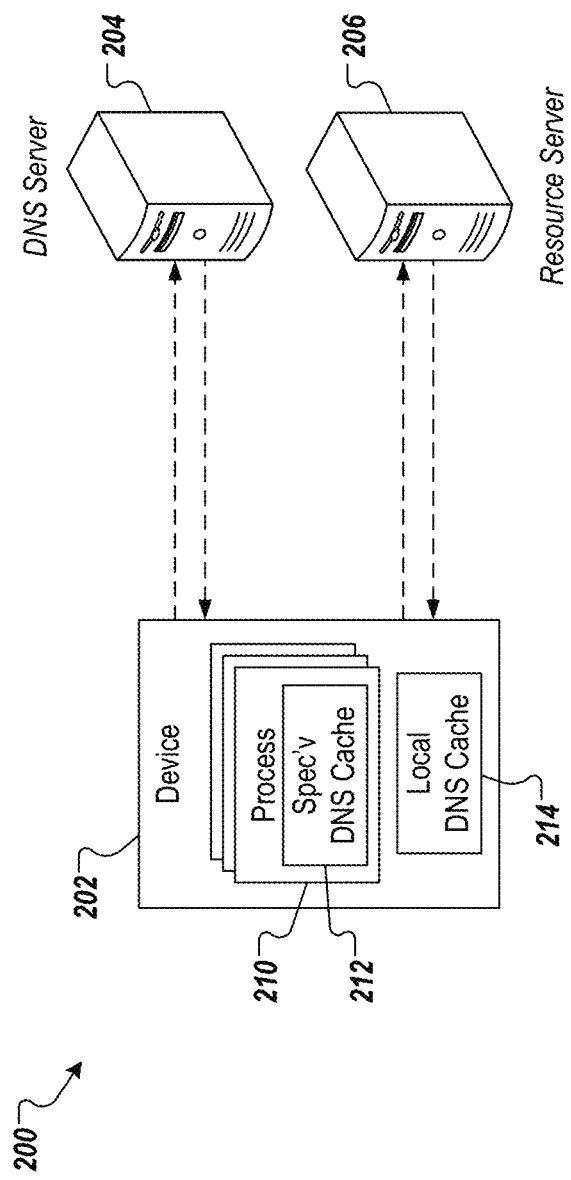
FIG. 2 depicts a conceptual architecture in accordance with implementations of the present disclosure.

FIG. 2 depicts an example conceptual architecture 200 in accordance with implementations of the present disclosure. In the example of FIG. 2, the example conceptual architecture 200 includes a device 202 (e.g., a computing device), a DNS server 204, and a resource server 206. Although a single device 202, a single DNS server 204, and a single resource server 206 are depicted, it is contemplated that implementations of the present disclosure can be realized with any appropriate number of devices, DNS servers, and resource servers.

In some examples, the device 202, the DNS server 204, and the resource server 206 are each provisioned within an enterprise network (e.g., an intranet) and are specific to an enterprise, for which the enterprise network is provisioned. For example, IP addresses of the enterprise network are specific to the enterprise network and not usable (e.g., are meaningless) outside of the enterprise network. This can account for instances, in which the device 202 requests resources that are stored within the enterprise network (e.g., resources stored on the resource server 206). In some examples, one or more DNS servers and/or one or more resource servers can be provided outside of the enterprise network. For example, one or more DNS servers and/or one or more resource servers can be provided using the Internet. This can account for instances, in which the device 202 requests resources that are stored outside of the enterprise network (e.g., resources stored on the Internet).

In the example of FIG. 2, the device 202 executes one or more processes 210 and at least one process 210 includes a speculative DNS cache 212. For example, and as discussed herein, the speculative DNS cache 212 can be provided with the process 210 as an executable library. In some examples, the device 202 can include an application server that executes at least a portion of an application. In some examples, the application is made up of a set of services (also referred to as microservices) in a service-oriented architecture (SOA). In these examples, each process 210 can be at least a portion of a service in the set of services that make up the application. In such arrangements, services, and thus processes 210, can be scaled-out across multiple application servers (e.g., horizontal scale-out) to, for example, ensure availability of the service.

In some examples, the process 210 can execute functionality that includes retrieving a resource using a URL. A DNS name provided in the URL is to be resolved to an IP address indicating a location of the resource. For example, the IP address can be the IP address assigned to the resource server 206, on which the resource that is being requested is stored. In order to retrieve the resource, the process 210 requests the IP address, connects to the resource server 206 using the IP address, makes the connection secure, requests the resource, and receives the resource.

In some examples, the process 210 queries the speculative DNS cache 212 for the IP address. For example, the process 210 issues a query to the speculative DNS cache 212 that uses the DNS name of the URL as an index to determine whether the IP address is stored in the speculative DNS cache 212. If the IP address is stored in the speculative DNS cache 212, the IP address is returned to the process 210, which uses the IP address to connect with the resource server 206 and retrieve the resource. If the IP address is not stored in the speculative DNS cache 212, the DNS server 204 is queried for the IP address. For example, a query including the DNS name of the URL is sent to the DNS server 204, which determines the IP address and returns the IP address. The process 210 uses the speculative DNS cache 212 to cache the IP address and uses the IP address to connect with the resource server 206 and retrieve the resource.

In accordance with implementations of the present disclosure, the speculative DNS cache 212 refreshes (updates) IP addresses at one or more refresh frequencies. The refresh frequency can be provided in refreshes per second. In some examples, a single refresh frequency is provided for all IP addresses stored in the speculative DNS cache 212. In some examples, multiple refresh frequencies are provided, one or more IP addresses stored in the speculative DNS cache 212 having respective refresh frequencies.

In some implementations, the refresh frequency is configured based on multiple parameters. Example parameters can include, without limitation, a number of IP addresses cached in the speculative DNS cache 212 and performance parameters of the enterprise network (e.g., bandwidth, server load). As a non-limiting example, if the speculative DNS cache 212 caches less than a threshold number of IP addresses, the refresh frequency can be a first value (e.g., 0.2 indicating every 5 seconds), otherwise the refresh frequency is a second value (e.g., 0.1 indicating every 10 seconds). As another non-limiting example, if one or more performance parameters are below respective performance thresholds, the refresh frequency can be a first value (e.g., 0.2), otherwise (e.g., if at least one performance exceeds a respective performance threshold) the refresh frequency is a second value (e.g., 0.1).

In some implementations, the refresh frequency can change over time, as parameters change. For example, and without limitation, the refresh frequency can be set to the first value, while less than the threshold number of IP addresses are cached in the speculative DNS cache 212. However, as cache entries are added and the number of IP addresses cached in the speculative DNS cache 212 exceed the threshold number of IP addresses, the refresh frequency can change to the second value. As another example, and without limitation, the refresh frequency can be set to the first value, while one or more performance parameters are below respective performance thresholds, and can change to the second value if at least one performance parameter exceeds a respective performance threshold. In some examples, the refresh frequency can change from the second value to the first value (e.g., the at least one performance metric falls back below the respective performance threshold).

With regard to a single refresh frequency, each IP address can be refreshed (updated) at the refresh frequency. That is, all IP addresses are updated at the same refresh frequency. In some examples, a refresh period for an IP address is determined based on the refresh frequency and the IP address is updated at the beginning of each period. For example, a refresh frequency of 0.2 can be considered as a non-limiting example. After an IP address is stored in the speculative DNS cache 212, a refresh period of 5 seconds begins tolling and, upon expiration of the refresh period, the IP address is refreshed, and a next refresh period begins tolling after the (updated) IP address is stored in the speculative DNS cache 212. In this manner, although all IP addresses use the same refresh frequency (e.g., 0.2), refresh periods of the IP address overlap, but are not identical. In this manner, updates of all IP addresses are not requested at the same time, and instead can be staggered. This mitigates load on the DNS server 204 (and any further upstream servers).

With regard to multiple refresh frequencies, different IP addresses can be refreshed (updated) at different refresh frequencies. For example, a first set of IP addresses can be associated with a first refresh frequency and a second set of IP addresses can be associated with a second refresh frequency that is less (in terms of number of occurrences per unit time) than the first refresh frequency. For example, and without limitation, the first refresh frequency can be 0.2 and the second refresh frequency can be 0.1. In this example, the IP addresses in the first set of IP addresses are requested more frequently by the process 210 than the IP addresses in the second set of IP addresses. That is, an IP address can be assigned to the first set of IP addresses or the second set of IP addresses based on how frequently the IP address is requested by the process 210. For example, IP addresses requested by the process 210 can be put in rank order based on frequency of request and can be assigned to respective sets based on the rank order (e.g., top X IP addresses in first set, next Y IP addresses in second set, etc.).

Continuing with the multiple refresh frequencies, a refresh period for an IP address is determined based on the respective refresh frequency and the IP address is updated at the beginning of each period. For example, a refresh frequency of 0.2 can be considered as a non-limiting example. After an IP address is stored in the speculative DNS cache 212, a refresh period of 5 seconds begins tolling and, upon expiration of the refresh period, the IP address is refreshed, and a next refresh period begins tolling after the (updated) IP address is stored in the speculative DNS cache 212. In this manner, although all IP addresses in the set of IP address use the same refresh frequency (e.g., 0.2), refresh periods of the IP address for that set of IP addresses overlap, but are not identical. In this manner, updates of the IP addresses in a set of IP addresses are not requested at the same time, and instead can be staggered. This mitigates load on the DNS server 204 (and any further upstream servers).

In some implementations, the speculative DNS cache 212 can transition from use of a single refresh frequency to use of multiple refresh frequencies. For example, for a first period of time (e.g., beginning upon instantiation of the process 210), all IP addresses that have been stored in the speculative DNS cache 212 are refreshed at the same refresh frequency. A frequency of request for each IP address can be determined based on requests during the first period of time, the IP addresses can be ranked based on respective frequencies and assigned to respective sets of IP addresses. For a second period of time, IP addresses are updated at a respective refresh rate corresponding to the set of IP addresses they are assigned to.

In some implementations, refreshing of the IP addresses can be temporarily halted in response to at least one of the one or more performance parameters exceeding a respective performance threshold, and can restart after the at least one of the one or more performance parameters falls below the respective performance threshold. In some implementations, the IP addresses can be sorted in rank order based on request frequency with the more frequently requested being higher in the rank order. In some examples, the IP addresses are refreshed in the rank order until the at least one of the one or more performance parameters exceeds the respective performance threshold. After the at least one of the one or more performance parameters exceeds the respective performance threshold, the IP addresses can continue to be refreshed. For example, refreshing the IP addresses can continue where left off in the rank order. As another example, refreshing the IP addresses can restart at the top of the rank order.

In some implementations, the speculative DNS cache 212 is only available to store a maximum number of IP addresses. That is, for example, if a process 210 requires more than the maximum number of IP addresses to be cached, the process 210 uses a local DNS cache 214. The local DNS cache 214 can be provided as a stand-alone program. In some examples, the local DNS cache 214 refreshes IP addresses using a traditional approach that triggers IP address refresh in response to URL requests, such as the traditional approaches discussed above.

In some implementations, the process 210 can use the speculative DNS cache 212 and the local DNS cache 214. For example, if the number of IP addresses to be cached exceeds the maximum number of IP addresses of the speculative DNS cache 212, a first set of IP addresses can be cached in the speculative DNS cache 212 and a second set of IP addresses can be cached in the local DNC cache 214. In some examples, the IP addresses can be sorted in rank order based on request frequency with the more frequently requested being higher in the rank order. The first set of IP addresses can include the highest-ranking IP addresses up to the maximum number of IP addresses of the speculative DNS cache 212, and the second set of IP addresses can include the remaining IP addresses. For example, if the maximum number of IP addresses is 100, but there are 150 IP addresses to be cached, the top 100 IP addresses of the rank order are cached in the speculative DNS cache and the remaining 50 IP addresses are cached in the local DNS cache 214.

Figure 3:
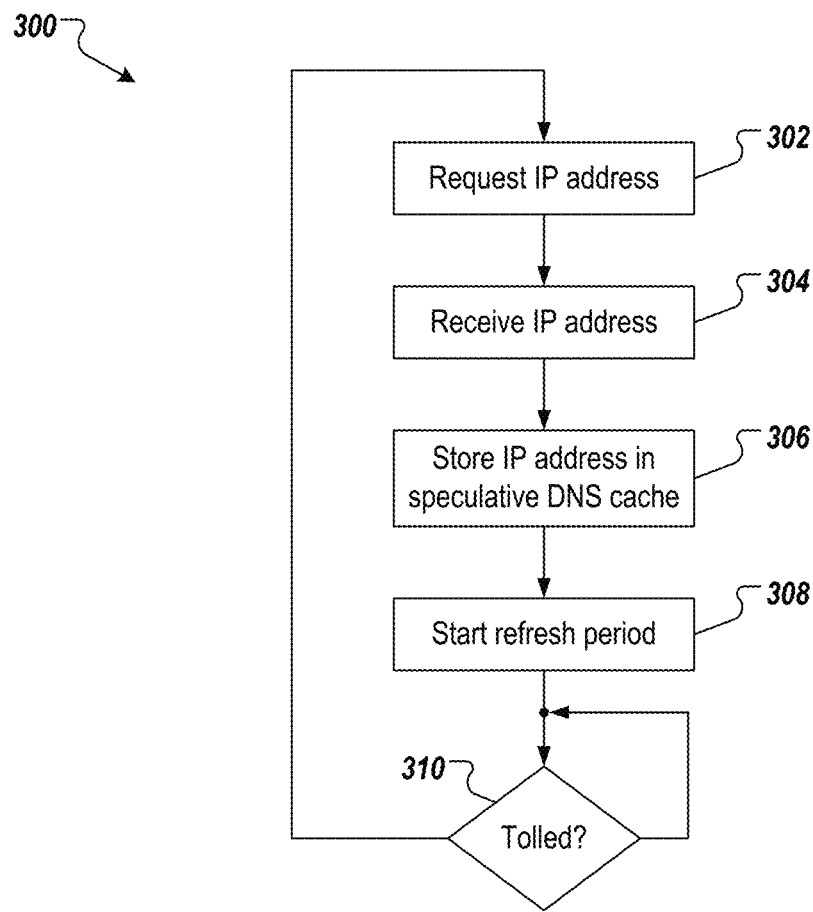
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. The example process 300 is discussed herein with reference to an IP address that is to be cached using a speculative DNS cache of the present disclosure. However, it is appreciated that the example process 300 is applicable to any appropriate number of IP addresses that are to be cached using a speculative DNS cache of the present disclosure.

An IP address is requested (302). For example, and as described herein, the process 210 can request the DNS server 204 to resolve a DNS name of a URL to an IP address. The IP address is received (304). For example, and as described herein, the process 210 receives the IP address from the DNS server 204. The IP address is stored in a speculative DNS cache (306). For example, the process 210 stores the IP address in the speculative DNS cache 212. A refresh period for the IP address is started (308). For example, and as described herein, a refresh rate is provided for the IP address. In some examples, the refresh period is provided based on the refresh rate. In some examples, the refresh period starts upon storing of the IP address in the speculative DNS cache 212. For example, the refresh frequency of 0.2 can be assigned to the IP address, which results in a refresh period of 5 seconds. The refresh period can begin upon storing of the IP address in the speculative DNS cache 212. It is determined whether the refresh period has tolled (310). For example, and continuing with the example above, it is determined whether 5 seconds has elapsed from start of the refresh period. If the refresh period has not tolled, the example process 300 loops back to continue waiting. If the refresh period has tolled, the example process 300 loops back to again request the IP address (302).

As described herein, implementations of the present disclosure provide one or more technical advantages. For example, the speculative DNS cache of the present disclosure mitigates unavailability of DNS servers (and/or other upstream servers) by using a refresh frequency instead of a trigger (a request for IP address from an application/process). In this manner, the IP addresses of the speculative DNS cache are more fresh (up-to-date) than traditional approaches. Further, the speculative DNS cache of the present disclosure mitigates situations, in which an IP address is requested and is to be refreshed in view of a TTL, but the DNS server (and/or other upstream servers) are not available to respond to the request to refresh the IP address. Further, by limiting the size of the speculative DNS cache, the number of requests to refresh IP addresses is limited, thereby mitigating the burden on technical resources (e.g., bandwidth, servers) in responding to refresh requests.

Figure 4:
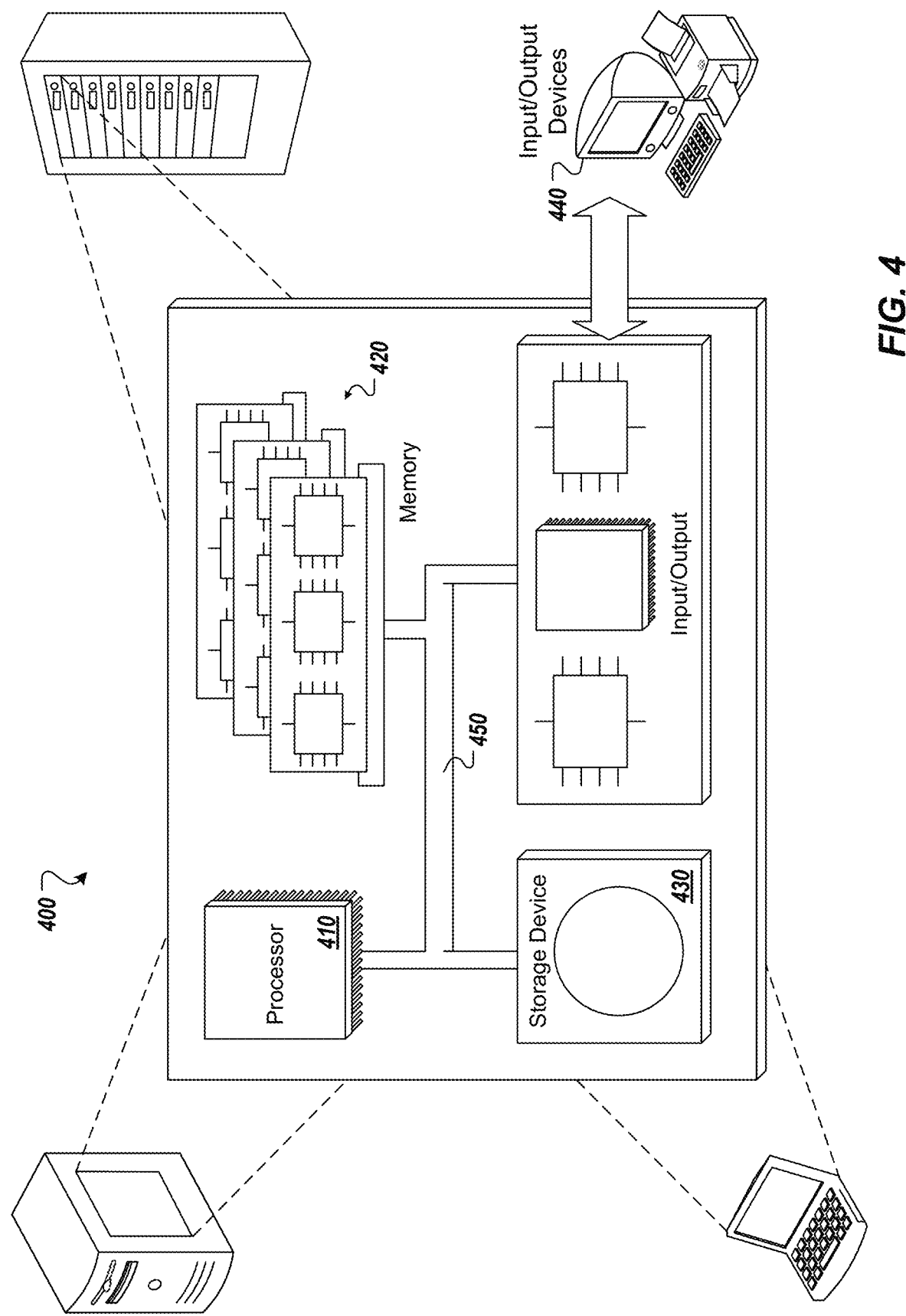
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for caching Internet protocol (IP) addresses, the method being executed by one or more processors and comprising:
   requesting, from a domain name system (DNS) server within an enterprise network, an IP address for a DNS name associated with a computing device;
   receiving the IP address;
   storing the IP address in a speculative DNS cache, the speculative DNS cache being operable to store IP addresses for a set of DNS names including the DNS name and being absent access to expiration times of any IP addresses stored therein;
   providing, by the speculative DNS cache, a refresh period for the IP address;
   determining that the refresh period of the IP address has tolled, and in response:
      refreshing the IP address in the speculative DNS cache; and
   determining that a number of IP addresses to be stored in the speculative DNS cache exceeds a threshold number of IP addresses, and in response:

storing a sub-set of the IP addresses in a local DNS cache.

2. The method of claim 1, wherein the refresh period is determined based on a refresh rate assigned to the IP address.

3. The method of claim 2, wherein the refresh rate of assigned to the IP address is determined based on a request frequency associated with the IP address.

4. The method of claim 1, wherein the local DNS cache refreshes the at least one IP address at least partially in response to a request for the IP address from a process.

5. The method of claim 1, wherein the speculative DNS cache is used to cache IP addresses in response to determining that a number of DNS names in the set of domain is less than a threshold number of DNS names.

6. The method of claim 1, wherein refreshing the IP address in the speculative DNS cache comprises:
   transmitting a DNS name of a URL to the DNS server; and
   receiving an updated IP address from the DNS server.

7. The method of claim 1, wherein the speculative DNS cache is an executable library executed by a process.

8. A non-transitory computer-readable storage medium coupled to one or more processors and having instructions stored thereon which, when executed by the one or more processors, cause the one or more processors to perform operations for caching Internet protocol (IP) addresses, the operations comprising:
   requesting, from a domain name system (DNS) server within an enterprise network, an IP address for a DNS name associated with a computing device;
   receiving the IP address;
   storing the IP address in a speculative DNS cache, the speculative DNS cache being operable to store IP addresses for a set of DNS names including the DNS name and being absent access to expiration times of any IP addresses stored therein;
   providing, by the speculative DNS cache, a refresh period for the IP address;
   determining that the refresh period of the IP address has tolled, and in response:
      refreshing the IP address in the speculative DNS cache; and
   determining that a number of IP addresses to be stored in the speculative DNS cache exceeds a threshold number of IP addresses, and in response:
      storing a sub-set of the IP addresses in a local DNS cache.

9. The non-transitory computer-readable storage medium of claim 8, wherein the refresh period is determined based on a refresh rate assigned to the IP address.

10. The non-transitory computer-readable storage medium of claim 9, wherein the refresh rate of assigned to the IP address is determined based on a request frequency associated with the IP address.

11. The non-transitory computer-readable storage medium of claim 8, wherein the local DNS cache refreshes the at least one IP address at least partially in response to a request for the IP address from a process.

12. The non-transitory computer-readable storage medium of claim 8, wherein the speculative DNS cache is used to cache IP addresses in response to determining that a number of DNS names in the set of domain is less than a threshold number of DNS names.

13. The non-transitory computer-readable storage medium of claim 8, wherein refreshing the IP address in the speculative DNS cache comprises:
   transmitting a DNS name of a URL to the DNS server; and
   receiving an updated IP address from the DNS server.

14. The non-transitory computer-readable storage medium of claim 8, wherein the speculative DNS cache is an executable library executed by a process.

15. A system, comprising:
   a computing device; and
   a computer-readable storage device coupled to the computing device and having instructions stored thereon which, when executed by the computing device, cause the computing device to perform operations for caching Internet protocol (IP) addresses, the operations comprising:
      requesting, from a domain name system (DNS) server within an enterprise network, an IP address for a DNS name associated with a computing device;
      receiving the IP address;
      storing the IP address in a speculative DNS cache, the speculative DNS cache being operable to store IP addresses for a set of DNS names including the DNS name and being absent access to expiration times of any IP addresses stored therein;
      providing, by the speculative DNS cache, a refresh period for the IP address;
      determining that the refresh period of the IP address has tolled, and in response:
         refreshing the IP address in the speculative DNS cache; and
      determining that a number of IP addresses to be stored in the speculative DNS cache exceeds a threshold number of IP addresses, and in response:
         storing a sub-set of the IP addresses in a local DNS cache.

16. The system of claim 15, wherein the refresh period is determined based on a refresh rate assigned to the IP address.

17. The system of claim 16, wherein the refresh rate of assigned to the IP address is determined based on a request frequency associated with the IP address.

18. The system of claim 15, wherein the local DNS cache refreshes the at least one IP address at least partially in response to a request for the IP address from a process.

19. The system of claim 15, wherein the speculative DNS cache is used to cache IP addresses in response to determining that a number of DNS names in the set of domain is less than a threshold number of DNS names.

20. The system of claim 15, wherein refreshing the IP address in the speculative DNS cache comprises:
   transmitting a DNS name of a URL to the DNS server; and
   receiving an updated IP address from the DNS server.

* * * * *